US008359340B2

(12) United States Patent
Basso et al.

(10) Patent No.: US 8,359,340 B2
(45) Date of Patent: Jan. 22, 2013

(54) SYSTEM AND METHOD FOR REPRESENTING MEDIA ASSETS

(75) Inventors: Andrea Basso, Marlboro, NJ (US); Paul Gausman, Bridgewater, NJ (US); David C. Gibbon, Lincroft, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 285 days.

(21) Appl. No.: 12/342,864

(22) Filed: Dec. 23, 2008

(65) Prior Publication Data
US 2010/0161575 A1 Jun. 24, 2010

(51) Int. Cl.
G06F 12/00 (2006.01)
G06F 17/30 (2006.01)
(52) U.S. Cl. ........ 707/821; 707/790; 707/913; 707/695; 715/716
(58) Field of Classification Search ................. 707/821, 707/790, 913, 695; 715/717; 717/169
See application file for complete search history.

(56) References Cited

U.S. PATENT DOCUMENTS

| 6,615,204 | B1* | 9/2003 | Menon | 1/1 |
|---|---|---|---|---|
| 6,654,029 | B1* | 11/2003 | Chiu et al. | 715/717 |
| 7,290,251 | B2* | 10/2007 | Livshits | 717/143 |
| 7,730,043 | B1* | 6/2010 | Bourdev | 707/695 |
| 2004/0225996 | A1* | 11/2004 | Venkatesan et al. | 717/100 |
| 2005/0022175 | A1* | 1/2005 | Sliger et al. | 717/169 |
| 2005/0149481 | A1* | 7/2005 | Hesselink et al. | 707/1 |
| 2005/0278715 | A1* | 12/2005 | Herle et al. | 717/162 |
| 2006/0179033 | A1* | 8/2006 | Stanke et al. | 707/2 |

* cited by examiner

Primary Examiner — Giovanna Colan

(57) ABSTRACT

Disclosed herein are systems, computer-implemented methods, and tangible computer-readable media for representing media assets. The method includes receiving an original media asset and derivative versions of the original media asset and associated descriptors, determining a lineage to each derivative version that traces to the original media asset, generating a version history tree of the original media asset representing the lineage to each derivative version and associated descriptors from the original media asset, and presenting at least part of the version history tree to a user. In one aspect, the method further includes receiving a modification to one associated descriptor and updating associated descriptors for related derivative versions with the received modification. The original media asset and the derivative versions of the original media asset can share a common identifying mark. Descriptors can include legal documentation, licensing information, creation time, creation date, actors' names, director, producer, lens aperture, and position data.

16 Claims, 6 Drawing Sheets

SYSTEM AND METHOD FOR REPRESENTING MEDIA ASSETS

BACKGROUND OF THE INVENTION

1. Field of the Invention

The present invention relates to representing media and more specifically to storing a tree of related media assets.

2. Introduction

With recent advances in technology, many individuals now possess the necessary tools for creating, editing, and sharing media. Indeed sites such as YouTube.com are based on the concept of users uploading home made videos as well as editing and/or commenting on others' videos. Further, digital media distribution on DVDs and online have allowed for many users to copy and paste sections from others' media, including commercial media, in their own creations. Users also create parodies of existing media which often trigger others to view the parodied media. Due to these and other factors, media is increasingly cross-pollinated. Users create tens of thousands of directly and indirectly derivative works every day. On top of these derivative works, professional studios often revise their work to make different versions or editions, such as a standard full-screen DVD, a widescreen extended edition DVD, a widescreen extended edition with director commentary HD-DVD, etc. These different media versions and derivative versions are currently very disconnected and not uniformly represented, especially when considering descriptors such as user comments, subtitles, alternate audio tracks, formats, metadata, etc. Accordingly, what is needed in the art is an improved way to represent and store related media assets and supplementary descriptive information.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for representing media assets. The method includes receiving an original media asset and derivative versions of the original media asset and associated descriptors, determining a lineage to each derivative version that traces to the original media asset, generating a version history tree of the original media asset representing the lineage to each derivative version and associated descriptors from the original media asset, and presenting at least part of the version history tree to a user. In one aspect, the method further includes receiving a modification to one associated descriptor and updating associated descriptors for related derivative versions with the received modification. The original media asset and the derivative versions of the original media asset can share a common identifying mark. Descriptors can include legal documentation, licensing information, creation time, creation date, actors' names, director, producer, lens aperture, and position data. Derivative versions can include the same asset stored in different media formats. Descriptors can include weights.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
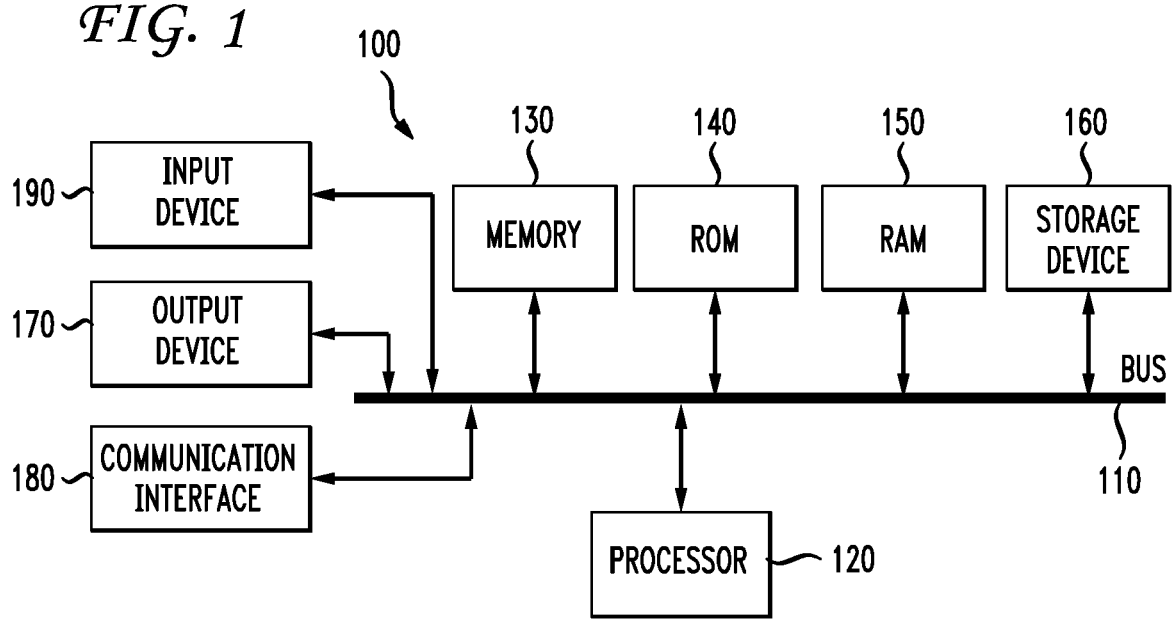
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
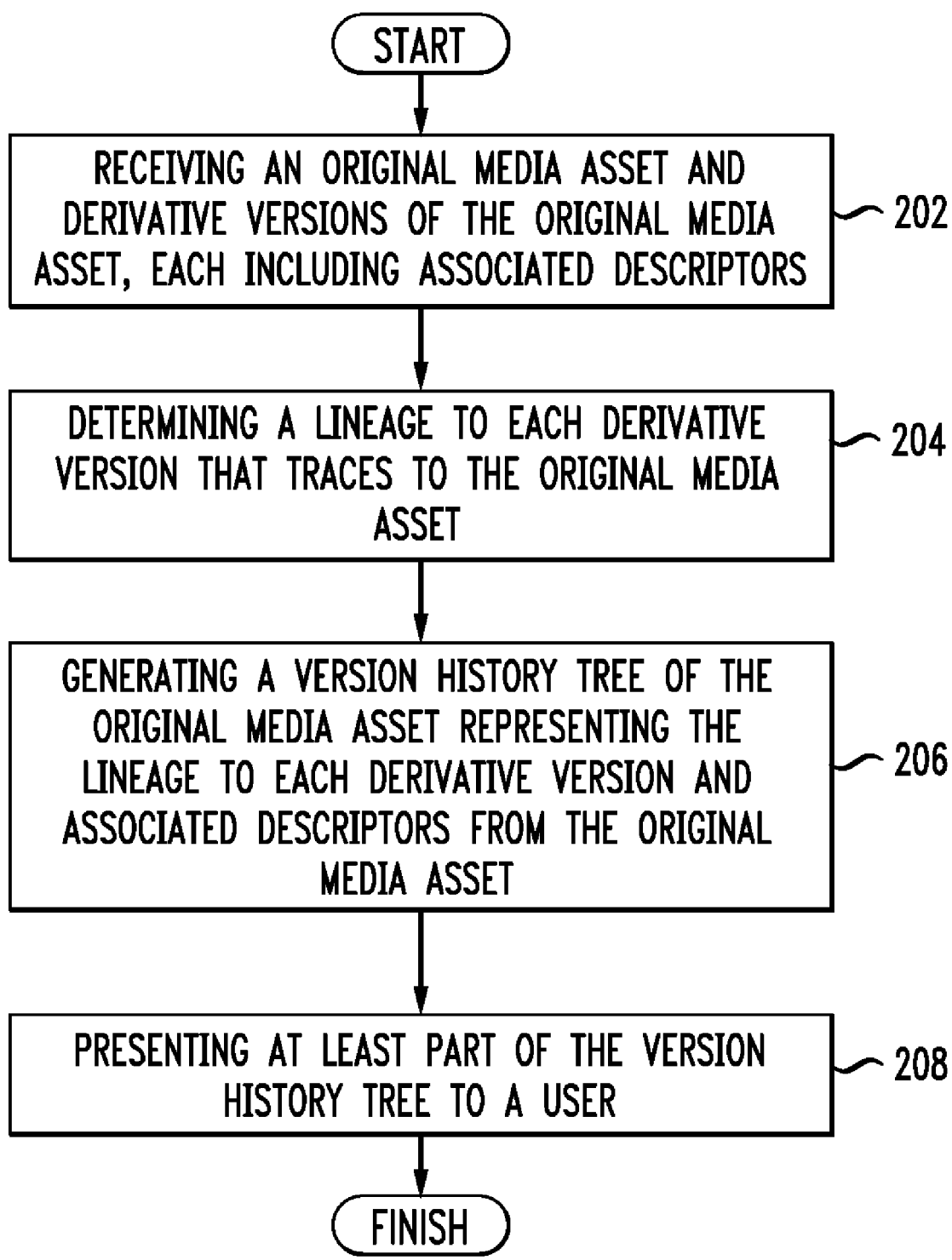
FIG. 2 illustrates an example method embodiment.

Having disclosed various system components, the disclosure turns to the example method embodiment for representing media assets, as illustrated in FIG. 2. For clarity, the method is discussed in terms of a system configured to practice the method. The system receives an original media asset and derivative versions of the original media asset, each including associated descriptors (202). The original media asset and derivative versions of the original media asset can be in any media form, video, audio, text, combined audiovisual, smell, and so forth. Derivative versions can contain the same basic information as the original media asset but stored in a different media format. For instance, the original version of a high definition video can be in Matroska MKV file format while a derivative version containing the same video but in a lower resolution can be in Flash Video FLV file format. However, derivative versions can also be entirely different from the original media asset, sharing only minimal commonalities. Descriptors, also known as metadata or user annotations, can include one or more of legal documentation, licensing information, creation time, creation date, continuation scripts, actors' names, director name, lens aperture, and position data. In one aspect, the system further receives user annotations, or metadata, or descriptors for the original media asset or the derivative versions of the original media asset and propagates the received user annotations as descriptors to the original media asset and related derivative versions of the original media asset. To facilitate this process, each descriptor can include a flag indicating whether or not the descriptor propagates upward to the original media asset. For instance, metadata or descriptors specific to a derivative version are not always applicable to parent versions of the media asset or the original version. Metadata can apply partway up the chain to the original, or source, media asset. The system can propagate descriptors or metadata downwards to child derivative versions.

The system determines a lineage to each derivative version that traces to the original media asset (204). The system can determine a lineage based in whole or in part on user input, media comparisons, creation date and time, duration, quality, media format, metadata/descriptors, and other data. In some cases, where the original media asset and the derivative versions of the original media asset share a common identifying mark, such as a watermark or digital fingerprint, the system can identify lineage based on the watermark. The system can encode all or part of the version lineage for a given media asset within the watermark. The system can use special marks which are resistant to detection, manual modification, or modification due to transcoding or other automated processes.

The system generates a version history tree of the original media asset representing the lineage to each derivative version and associated descriptors from the original media asset (206). The system can generate a version history tree using pointers to derivative versions. The system can store derivative versions of the original media asset as sets of instructions which can reconstruct the derivative versions from the original media asset. The system can assign a propinquity score, weight, or distance to each derivative version based on distance from the original media asset. In this way, metadata or descriptors for a very remotely related media asset are given little weight absent some other reason to assign a higher weight. Weights can also be based on when respective descriptor was created, who created the respective descriptor, by what authority the respective descriptor was created, and other factors.

The system presents at least part of the version history tree to a user (208). The system can present the entire tree to the user in a graphical layout showing the various connections and thumbnails of each media asset. The system can show as few as one or two media assets, directly or indirectly connected, with some indication of how they are connected. In one aspect, the system receives an input from the user selecting an item in the version history tree and subsequently plays the selected item for the user.

In one aspect, the system receives a new derivative version and new descriptors associated with the new derivative version. The system can then insert the new derivative version and new descriptors into the version history tree. The system can propagate fresh descriptors upwards and downwards, as necessary. In a related aspect, the system receives a new derivative version of the original media asset without descriptors. In this case, the system can inherit new descriptors for the new derivative version from existing descriptors and inserting the new derivative version and the new descriptors into the version history tree. Similarly, the system can receive a modification to one associated descriptor and update associated descriptors for related derivative versions with the received modification.

In some cases, a media asset inherits or is derived from multiple sources. One example of this is a YouTube mash-up video combining audio from a heavy metal song with a Japanese anime cartoon. The mash-up is properly a derivative media asset from both the heavy metal song and the Japanese cartoon. The system can insert the mash-up in two separate trees, or the system can link one version history tree with a second version history tree for a related media asset. In this way, the system can maintain only one instance of the mash-up, thereby eliminating overhead of keeping both versions of the mash-up consistent. The system can store an ecosystem of version history trees with varying levels of overlapping media assets. In this case, flag indicating whether or not descriptors propagate upward or downward can become very useful to prevent descriptors from polluting unrelated media assets. In fact, the system can allow users to manually delete one descriptor and all available propagated versions of the descriptor.

Figure 3:
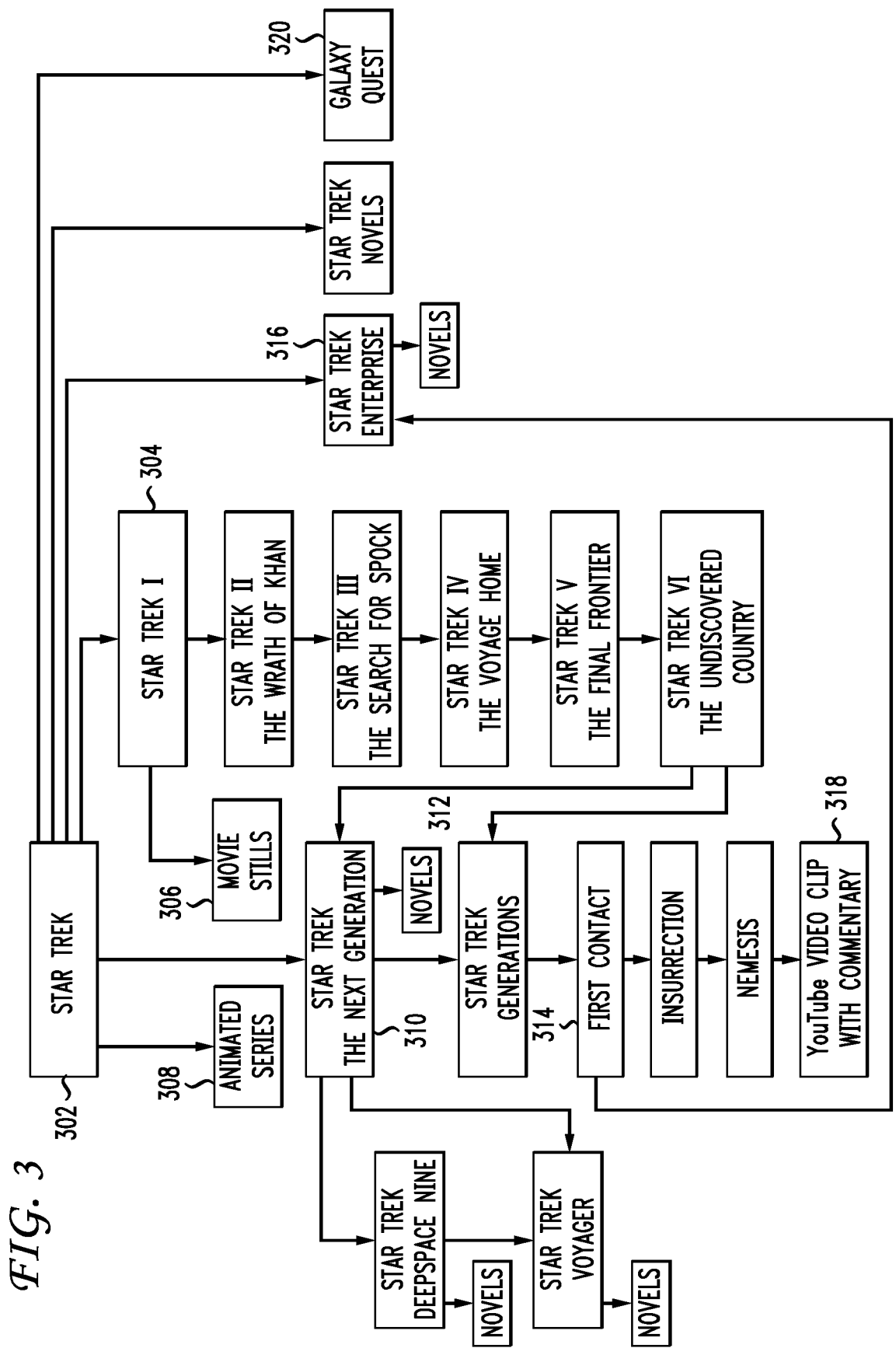
FIG. 3 illustrates a media version history tree.

FIG. 3 illustrates a media version history tree. Although FIG. 3 does not illustrate metadata or descriptors, each media asset in the version history tree can contain such descriptors, whether new or inherited from a parent. The original media asset in this example is the original Star Trek television series 302. The other depicted media assets contain little, if any, footage from the original television series, but they are continuations of the same universe, characters, and themes, thus they share at least some common descriptors and a common heritage. The system can propagate metadata annotations backward and/or forward to parent and/or child media assets, keeping metadata for specific versions selectively if necessary. The original television series spawned a series of Star Trek movie sequels 304 and associated movie stills 306. Media assets can include movies, television, audio, photographs, books, CDs, DVDs, and anything else that can be represented digitally. These series contained the original cast of the television series, so they share that metadata. An animated series 308 with most of the original cast also followed the original television series. Much later, the producers of the original television show produced another television series, Star Trek: The Next Generation (TNG) 310. Novels 312 based on TNG 310 were released and can be considered derivative media assets. At the conclusion of the television series, a movie, Star Trek: Generations was created starring actors from both the original and the new television series. The media version history tree shows arrows indicating inheritance from TNG 310 as well as Star Trek VI. The next TNG movie, Star Trek: First Contact 314 contains a scene used later in the opening credits for Star Trek: Enterprise 316, as indicated by an arrow. A user copies a portion of the final Star Trek movie to date, Star Trek: Nemesis, and posts the copied portion on YouTube with audio commentary 318. The YouTube clip 318 may share a significant portion of the metadata from Nemesis, but is unlikely to share very much metadata with Star Trek I 304 or Star Trek: Enterprise 316. Other derivative works branch off from various spots in the version history tree. Each is tied together by a common source, Star Trek the original television series 302. In some cases even a parody such as Galaxy Quest 320, which contains no explicit reference to the original Star Trek television series 302, contains sufficient references to be included in a media version history tree.

In some cases, the system can collect descriptors or metadata from external sources, such as Nielsen Ratings or movie rental charts. The system can provide some kind of linkage to an analytic process module which filters metadata to data mine probable key elements. The system can relate media assets based on probable key elements. The system can tag media assets with descriptors down to a frame level. For instance, the system can tag individual frames to indicate when product placement occurs, or to indicate a spoken reference to a later or prior media asset.

Figure 4:
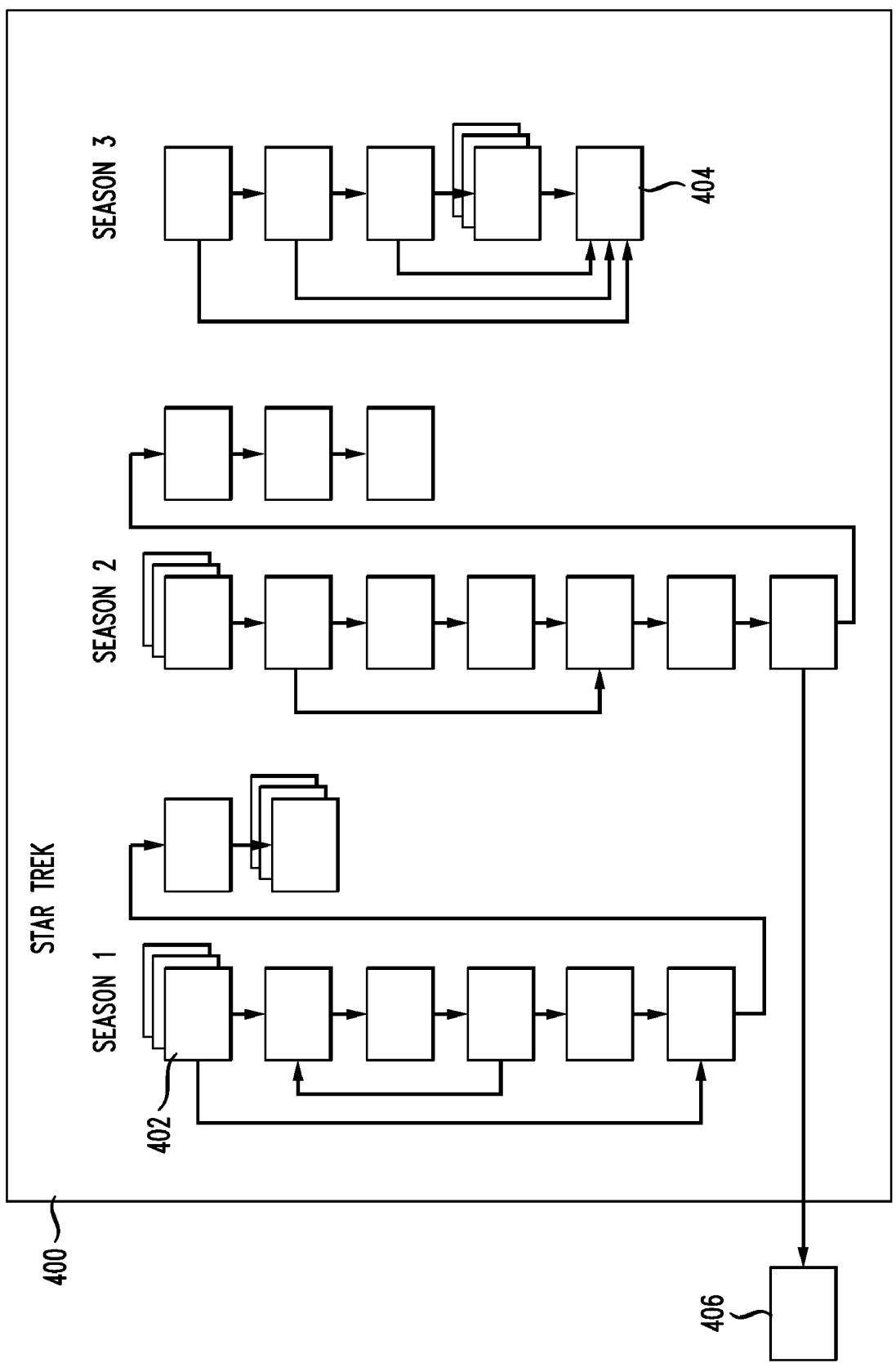
FIG. 4 illustrates another media version history tree.

FIG. 4 illustrates another media version history tree 400 of the original Star Trek television series 302 as shown in FIG. 3. Each media asset in FIG. 3 can be made up of several sub-assets, such as segments, episodes, or seasons of a television series. In this example, the first episode 402 of season 1 has arrows to two other episodes, indicating that the two other episodes trace their lineage through actors, plot, events, or some other feature to the first episode 402. The final episode 404 of season 3 traces its lineage from multiple previous episodes. In some cases, specific episodes spawn media assets outside the television series, such as a full-length motion picture 406. Traditionally each episode of a series continues with the changes and plot line of the previous episode, as indicated by the arrows from each episode to each succeeding episode. While the previous examples illustrate corporate controlled media examples, the system can accept individually produced media, such as home videos or video blogs.

Figure 5:
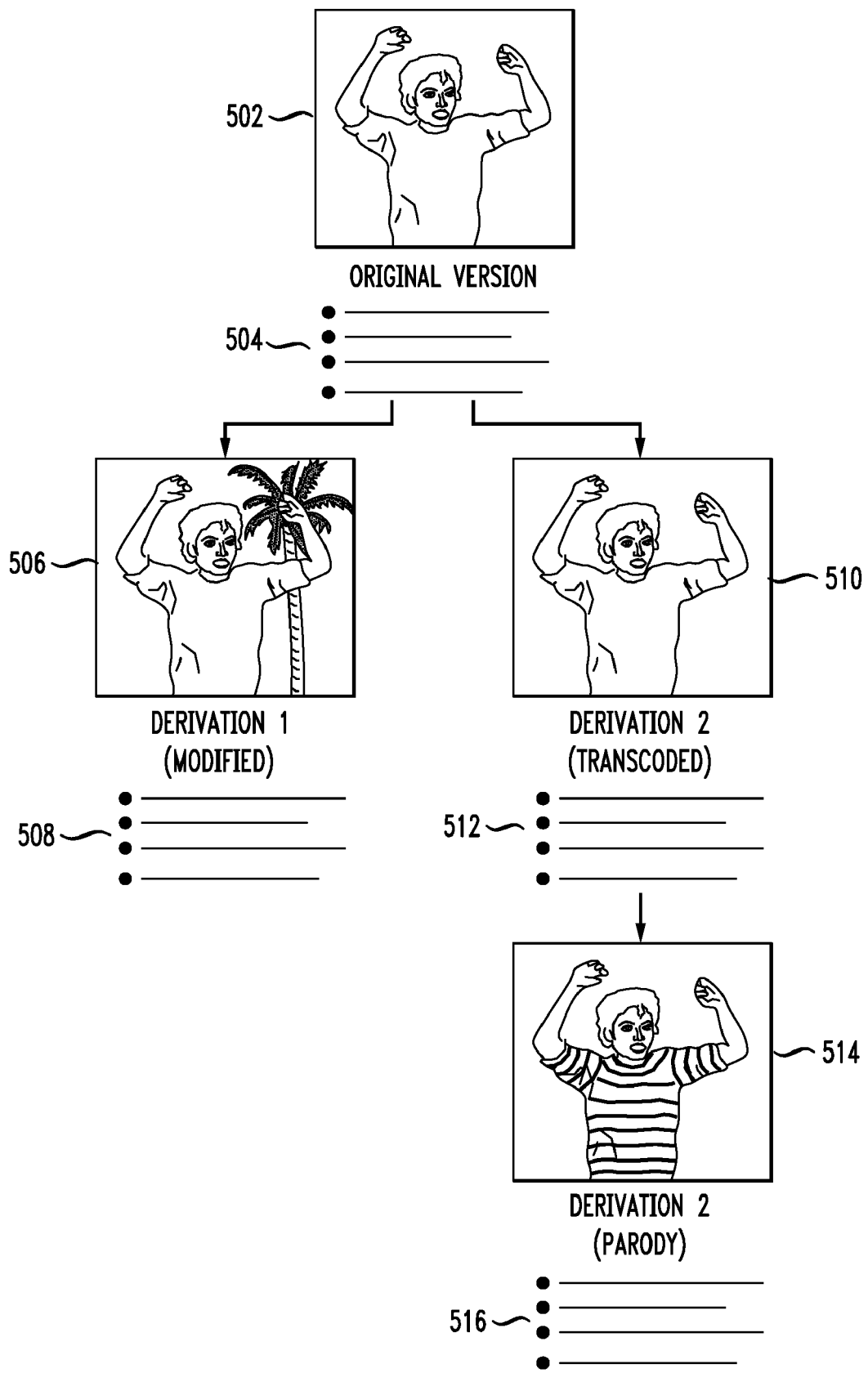
FIG. 5 illustrates metadata and derivative works in a media version history tree.

FIG. 5 illustrates metadata and derivative works in a media version history tree. An original version of the media asset 502 has associated metadata 504 describing various aspects of the original version 502. A modified, derivative version 506 of the media asset can insert additional video objects, change existing video objects, insert additional sounds, remove sounds, speed up playback, slow down playback, insert the original version into another video altogether, etc. In this case, the modified, derivative version 506 inserts a palm tree in the background of the original version 502. The metadata 508 describing the derivative version 506 can include additional information describing the differences between the original and the derivative versions. The metadata 508 can include a list of all parent or source media assets which have been included in the derivative. For example, a video mash-up can include parts of multiple sources. Each source can be included. A lineage pointer to the constituent sources can be part of that metadata. One situation where this approach can be useful is a video sharing site such as You- Tube. On YouTube, users freely modify others' videos for purposes of critique, parody, sarcasm, analysis, comparison, discussion, etc. These versions and their accumulated layers of comments are a form of media content. The system stores these media assets in a tree structure tracing back to the original media source or sources.

Even transcoded versions 510 of the original version 502 are derivatives. A transcoded version 510 can include its own metadata 512 describing the original version as well as any transcoding information, such as resolution, frames per second, subtitles, and media container format. Some versions of the media asset can include no portions from the original version, such as a movie sequel or a parody. A movie sequel can trace back to multiple previous media assets which are referenced in the sequel or which led to events in the sequel. A parody of the media asset can trace its lineage to one or more parodied original media assets. A classic example of this is The Simpsons. One episode of The Simpsons can parody several movies, commercials, other television shows, and even prior episodes of The Simpsons. Such an episode can trace multiple lines back to multiple original versions. A parody 514 can contain its own metadata 516. While changes to metadata from a transcoded version of a media asset may propagate back to the original version, metadata from a parody may not. An example of metadata relevant to a parody which is not relevant to the original version is Weird Al Yankovic's song "White and Nerdy" which parodies Chamillionaire's song "Ridin' Dirty." "White and Nerdy" can include descriptors of a Segway and the Star Wars Christmas Special, where those descriptors mean nothing to the original "Ridin' Dirty." A parody of a parody, such as stop-motion reenactments of "White and Nerdy" with Lego Minifig characters, can inherit some or all of the descriptors of the parodied media asset and/or the original media asset. Even if no metadata is shared between the original media asset and a given derivative media asset, the tree still forms a chain of derivative works tracing back to the source(s).

The system can embed descriptors or metadata in the media asset itself or store it as a separate file. Consumption or viewing patterns of videos are properly considered metadata, especially in an online or streaming playback environment because these patterns can indicate popularity. Consumption or viewing patterns tracked and displayed over time can also be metadata. The system can merge trees if a single derivative media asset incorporates parts of multiple original media assets. In a related aspect, the system can display a history of changes for each version over time serially or simultaneously.

The system can allow users to search for media assets quickly. The user may find a derivative or parent version of a desired media asset which can quickly lead the user to the desired media asset. In order to store these media assets efficiently, the system can store just the differences necessary to recreate derivative works, for example. In one aspect, the system stores original and derivative media assets in a manner similar to software development version control packages such as Subversion or CVS. The system can implement a set of very simple rules distributed among many devices and locations to stigmergically construct a media lineage tree with descriptors.

Figure 6:
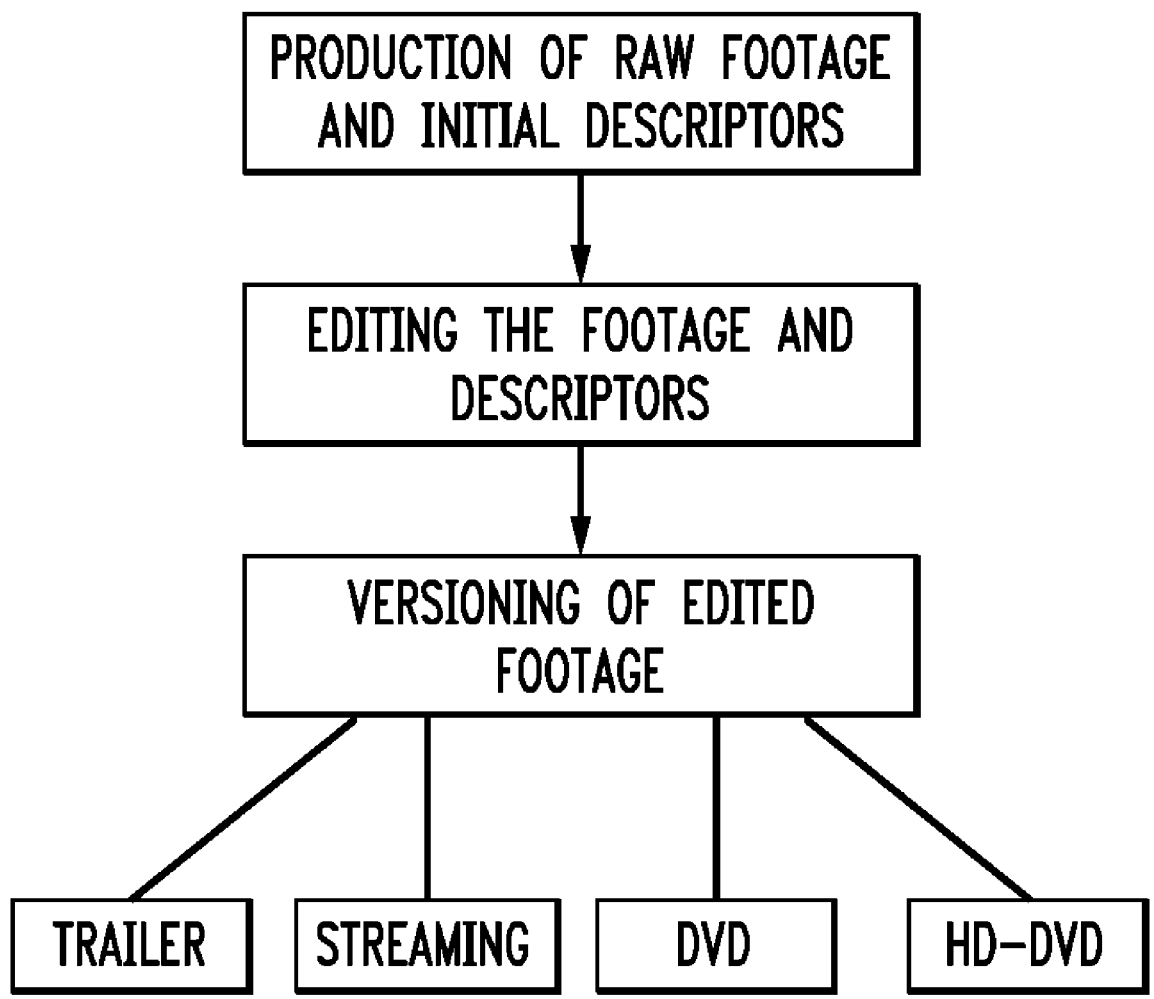
FIG. 6 illustrates a workflow for organized production of a media version history.

FIG. 6 illustrates a workflow for organized production of a media version history. A professional movie studio can follow this exemplary workflow. The original media asset is the initial production of the raw footage and the initial descriptors or metadata. In a film setting, the hours and hours of film and the hundreds of takes are the original media asset. Initial descriptors include information such as time and date, included actors, director, type of camera used, camera effects included, and GPS location. An automatic system can generate metadata, such as that found in a modern digital camera, and/or a person can manually enter metadata. With the exception of live media, such as plays or concerts, the original film takes are not what ends up in the final product. An editor, producer, director, or similar person edits the footage and the descriptors to create edited footage. The editor can create various versions of this edited footage, such as a director's edition, extended edition, or a "special features" edit. These various versions are not shown in FIG. 6, but can be represented by additional branches from the production of raw footage and initial descriptors. The system tracks the edited footage and descriptors as being a "child" from the original media. Versions of the edited footage, such as a trailer, online video stream, DVD, and HD-DVD, trace their lineage back to the original raw footage. As each version is modified, the system can add or remove descriptors as appropriate. Descriptors can include whether or not the media is protected by copyright, who owns the copyright interest, how much a customary or typical royalty is for this piece of media, when it was created, etc. Other users can create, modify, or consume any of the media assets. The system creates a fork in the tree for each derivative work. The descriptors, or metadata, for each derivative can include a weight. The weight can indicate how far removed the original descriptor is from the derivative. For example, the initial descriptors in the raw footage may have little to do with the trailer for the movie, so they would have a low weight, whereas the special features segment of an HD-DVD may contain unaltered portions of the raw footage, so the initial descriptors for those portions can include a high weight.

The weight of each descriptor can be based on factors such as the number of intervening edits or how much time has elapsed between the original and the derivative media. In the case of user comments, comment weights can be based on when the comments were made, who made the comments, the authority of the person making the comments, user rankings of the comments, other comments, etc. Descriptor weights can be based on confidence in the media, ties to the original media asset, popularity of the version, commenter rankings, and/or other rule-based criteria. Ranking or weight can be based on all or some of these factors. In fact, the distance or number of steps between two media assets can be a descriptor.

The system can watermark or otherwise add a "fingerprint" to uniquely identify the original media asset and to assist in tracking versions derived from the original. Even in the absence of such a watermark, a media comparator can examine media to determine which media assets are similar, related, or contain portions of another media asset. A video website such as YouTube can apply a media comparator to existing or newly added videos to determine a possible lineage or sources of the video content.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone environments or in a network. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to online video sharing websites, such as YouTube, or to media conglomerates which produce many versions of a particular media asset. Those skilled in the art will readily recognize various modifications and changes that may be made to the present invention without following the example embodiments and applications illustrated and described herein, and without departing from the true spirit and scope of the present invention.

We claim:

1. A method comprising:
   tracking derivative versions of an original media asset and associated descriptors, wherein the associated descriptors comprise instructions for propagating new descriptors;
   assigning a weight to each of the associated descriptors, wherein the weight for a respective one of the associated descriptors is based on at least one of when the respective one of the associated descriptors was created, who created the respective one of the associated descriptors, and by what authority the respective one of the associated descriptors was created, to yield weighted associated descriptors;
   based on the derivative versions of the original media asset and the weighted associated descriptors, determining a lineage for the derivative versions that traces to the original media asset;
   generating a version history tree of the original media asset representing the lineage of the derivative versions, the version history tree comprising instructions for propagating the new descriptors along the version history tree;
   presenting at least part of the version history tree to a user;
   responsive to a user request for access to one of the derivative versions from the version history tree, reconstructing the one of the derivative versions using the original media asset and at least part of a set of instructions for reconstructing the one of the derivative versions; and
   linking the version history tree with a second version history tree for a related media asset.

2. The method of claim 1, further comprising:
   receiving a modification to one of the associated descriptors; and
   updating the one of the associated descriptors based on the modification.

3. The method of claim 1, further comprising:
   receiving a new derivative version of the original media asset and new descriptors associated with the new derivative version; and
   inserting the new derivative version and new descriptors into the version history tree.

4. The method of claim 1, further comprising:
   receiving an input from a user selecting an item in the version history tree; and
   playing the item.

5. The method of claim 1, wherein the original media asset and the derivative versions of the original media asset share a common identifying mark.

6. The method of claim 1, wherein the associated descriptors comprise at least one of legal documentation, licensing information, creation time, creation date, continuation scripts, actors' names, director name, lens aperture, and position data.

7. The method of claim 1, further comprising:
   receiving user annotations for the original media asset and one of the derivative versions of the original media asset; and
   propagating the user annotations as the new descriptors for the original media asset, the one of the derivative versions, and at least one other derivative version of the original media asset.

8. The method of claim 1, further comprising assigning a propinquity score to each of the derivative versions based on distance from the original media asset.

9. The method of claim 1, further comprising:
   receiving a new derivative version of the original media asset without associated descriptors;
   inheriting new descriptors for the new derivative version from existing ones of the associated descriptors; and
   inserting the new derivative version and the new descriptors into the version history tree.

10. The method of claim 1, wherein each one of the associated descriptors comprises a flag indicating whether the one of the associated descriptors propagates upward to the original media asset.

11. The method of claim 1, wherein the derivative versions further comprise a same asset stored in different formats.

12. A system comprising:
    a processor; and
    a computer-readable medium having stored therein instructions which, when executed by the processor, cause the processor to perform a method comprising:

tracking derivative versions of an original media asset and associated descriptors, wherein the associated descriptors comprise instructions for propagating new descriptors;

assigning a weight to each of the associated descriptors, wherein the weight for a respective one of the associated descriptors is based on at least one of when the respective one of the associated descriptors was created, who created the respective one of the associated descriptors, and by what authority the respective one of the associated descriptors was created, to yield weighted associated descriptors;

based on the derivative versions of the original media asset and the weighted associated descriptors, determining a lineage for the derivative versions that traces to the original media asset;

generating a version history tree of the original media asset representing the lineage of the derivative versions, the version history tree comprising instructions for propagating the new descriptors along the version history tree;

presenting at least part of the version history tree to a user;

responsive to a user request for access to one of the derivative versions from the version history tree, reconstructing the one of the derivative versions using the original media asset and at least part of a set of instructions for reconstructing the one of the derivative versions; and linking the version history tree with a second version history tree for a related media asset.

13. The system of claim 12, the computer-readable medium storing further instructions which result in the method further comprising:

receiving a modification to one of the associated descriptors; and updating the one of the associated descriptors based on the modification.

14. The system of claim 12, the computer-readable storage medium storing further instructions which result in the method further comprising:

receiving a new derivative version of the original media asset and new descriptors associated with the new derivative version; and inserting the new derivative version and new descriptors into the version history tree.

15. A non-transitory computer-readable storage medium having stored instructions which, when executed by a processor, cause the processor to perform a method comprising:

tracking derivative versions of an original media asset and associated descriptors, wherein the associated descriptors comprise instructions for propagating new descriptors;

assigning a weight to each of the associated descriptors, wherein the weight for a respective one of the associated descriptors is based on at least one of when the respective one of the associated descriptors was created, who created the respective one of the associated descriptors, and by what authority the respective one of the associated descriptors was created, to yield weighted associated descriptors;

based on the derivative versions of the original media asset and the weighted associated descriptors, determining a lineage for the derivative versions that traces to the original media asset;

generating a version history tree of the original media asset representing the lineage of the derivative versions, the version history tree comprising instructions for propagating the new descriptors along the version history tree;

presenting at least part of the version history tree to a user;

responsive to a user request for access to one of the derivative versions from the version history tree, reconstructing the one of the derivative versions using the original media asset and at least part of a set of instructions for reconstructing the one of the derivative versions; and linking the version history tree with a second version history tree for a related media asset.

16. The non-transitory computer-readable storage medium of claim 15, the non-transitory computer readable storage medium storing further the instructions which result in the method further comprising:

receiving a modification to one of the associated descriptors; and updating the one of the associated descriptors based on the modification.

* * * * *